Oct. 27, 1970 KYOHEI MURAKAWA ET AL 3,536,625

PIEZOELECTRIC CERAMIC COMPOSITION

Filed Oct. 25, 1967 4 Sheets-Sheet 1

TEMPERATURE CHANGE IN RESONANT FREQUENCY

Oct. 27, 1970 KYOHEI MURAKAWA ET AL 3,536,625

PIEZOELECTRIC CERAMIC COMPOSITION

Filed Oct. 25, 1967 4 Sheets-Sheet 4

PLANAR COUPLING FACTOR OF
$Pb(MgW)_{\frac{1}{2}}O_3$-$PbTiO_3$-$PbZrO_3$ FAMILY 3,536,625
PIEZOELECTRIC CERAMIC COMPOSITION Kyohei Murakawa, Yokohama-shi, and Koichi Niwa, Tokyo, Japan, assignors to Fujitsu Limited, Kawasaki, Japan, a corporation of Japan Filed Oct. 25, 1967, Ser. No. 678,036
Claims priority, application Japan, Oct. 26, 1966, 41/70,844; Nov. 29, 1966, 41/78,472
Int. Cl. C04b 35/00
U.S. Cl. 252—62.9 2 Claims

ABSTRACT OF THE DISCLOSURE

Described is a three component piezoelectric ceramic composition of $(Pb(Mg \cdot W)_{1/2}O_3)_x$, $(PbTiO_3)_y$ and $(PbZrO_3)_{(1-x-y)}$ having the composition of the range contained in polygon ABCDEFGA in the triangular composition diagram shown in FIG. 2 wherein

| | $Pb(Mg \cdot W)_{1/2}O_3$ | $PbTiO_3$ | $PbZrO_3$ |
|---|---|---|---|
| A | 0.05 | 0.15 | 0.80 |
| B | 0.05 | 0.35 | 0.60 |
| C | 0.05 | 0.55 | 0.40 |
| D | 0.05 | 0.80 | 0.15 |
| E | 0.10 | 0.80 | 0.10 |
| F | 0.80 | 0.10 | 0.10 |
| G | 0.10 | 0.10 | 0.80 |
| A | 0.05 | 0.15 | 0.80 |

and containing as additives at least one member of the group consisting of iron oxide, chromium oxide, manganese oxide, lanthanum oxide and niobium oxide in an amount of from 0.1 to 2% by weight, together with 0.02 to 0.5% by weight of silicon dioxide.

Our invention relates to piezoelectric ceramic compositions and a method of manufacturing the same.

Well known piezoelectric ceramics such as, for example, barium titanate ceramics ($BaTiO_3$) and lead titanate-zirconate ceramics ($Pb(TiZr)O_3$ or $PbTiO_3/PbZrO_3$) are utilized as various kinds of electromechanical transducers by applying DC electric field to them and polarizing them, causing them to have piezoelectric properties. These piezoelectric ceramics are utilized, for example, as acoustic transducers in pickups and microphones, ultrasonic resonators, so-called "mechanical filters" and intermediate frequency transformers of 455 kc. The main object of our invention is to provide piezoelectric ceramics that can be utilized as mechanical filters or ceramic filters of high performance, but, needless to say, these ceramics can also be utilized as the other devices described above.

Our invention relates to the lead magnesium tungstate/lead titanate/lead zirconate system $$((Pb(Mg \cdot W)_{1/2}O_3)_x(PbTiO_3)_y/(PbZrO_3)_{(1-x-y)})$$

which is a new piezoelectric ceramic, and to an additive that can effectively improve the electromechanical properties, and to an additive that can also improve the temperature characteristic.

Figure 1:
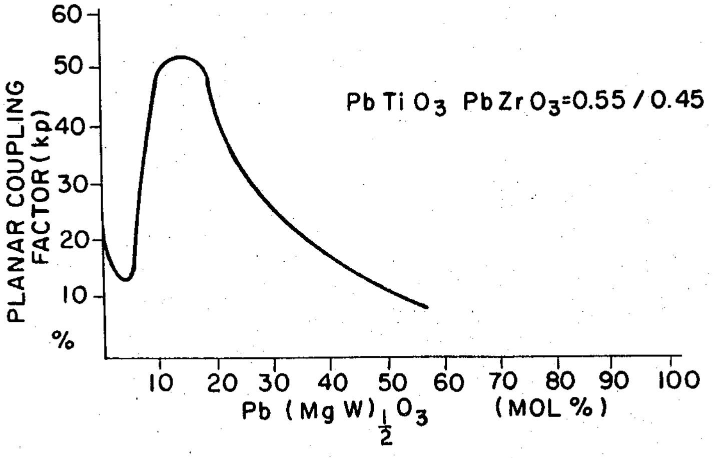
FIG. 1 shows the variation of the planar coupling factor (*kp*) when $Pb(Mg \cdot W)_{1/2}O_3$ is added to a composition of $PbTiO_3$ of 0.55 mol and $PbZrO_3$ of 0.45 mol.

It is generally known that, when an anti-ferroelectric substance and a ferroelectric substance that are similar to each other in structure are solved into a solid solution, ferroelectricity is exhibited. For example, a solid solution (what is called a "ceramic") consisting of lead titanate and lead zirconate is an excellent ferroelectric substance and an excellent piezoelectric ceramic. Lead titanate is a ferroelectric having the perovskite-type structure and lead zirconate is an anti-ferroelectric having the similar structure. However, when lead zirconate and lead titanate above several mol percent are solved into a solid solution, the lead zirconate is converted into a ferroelectric. This was reported in 1952 by G. Shirane, K. Suzuki and A. Takeda in Journal of the Physical Society of Japan, vol. 7, No. 12, 1952.

The present inventors utilized the same phenomenon between lead magnesium tungstate and lead titanate. It was reported by G. A. Smolenskii, A. I. Agranouskaya and V. A. Isupov in Fizika Tuerdogo Tela, vol. 1, 990, 1959 that lead magnesium tungstate ($Pb(Mg \cdot W)_{1/2}O_3$) is an anti-ferroelectric having the perovskite-type structure and its Curie point is 40° C. When lead magnesium tungstate and lead titanate are solved into a solid solution, ferroelectricity is exhibited and piezoelectricity also increases greatly. When lead magnesium tungstate of 50 mol percent and lead titanate of 50 mol percent were solved into a solid solution, an excellent ceramic could be obtained and when said ceramic was polarized by a strong DC electric field, an electromechanical coupling factor of 15–20% could be obtained.

This ceramic, however, was still unsatisfactory for practical use as a piezoelectric element. We therefore improve the characteristic by further solving lead zirconate to obtain extremely excellent results. For example, when a three component solid solution consisting of 15 mol percent lead magnesium tungstate ($Pb(Mg \cdot W)_{1/2}O_3$), 45 mol percent lead titanate ($PbTiO_3$) and 40 mol percent lead zirconate ($PbZrO_3$) was polarized by a DC electric field of 40 kv./cm., the electromechanical coupling coefficient (planar coupling factor) was 0.40 and the mechanical Q$m$ as a resonator was 300.

The electromechanical coupling coefficient and the Q$m$ were calculated approximately in the following manner by the constant-current method.

$$kp^2=2.51\,\frac{fa-fr}{fr}$$ expressed by the value of $kp\times 100$ when expressed by percent $$Qm=\frac{fr}{\Delta f} \qquad \Delta f=fr_1-fr_2$$

$Qm=100<$
$kp=0.30<$

Here, $fa$=anti-resonance frequency
$fr$=resonance frequency
$kp$=planar coupling factor (electromechanical coupling factor in the radial direction)
$Qm$=quality of resonance
$\left.\begin{matrix}fr_1\\fr_2\end{matrix}\right\}$=frequency 3 db higher than $fr$.

The generally known solid solution of lead titanate and lead zirconate is an excellent piezoelectric material. It is, however, difficult to manufacture this kind of solid solution since much of the lead oxide evaporates in the manufacturing process. However, it is very easy to make a solid solution of lead titanate and lead zirconate. And when a minute amount of additive is added, the additive is ordinarily diffused by interstitial diffusion.

Based on the same idea, an excellent result cannot be obtained when a three component ceramic of lead magnesium tungstate/lead titanate/lead zirconate is manufactured. For example, when lead magnesium tungstate of 0.5% by weight, 1% by weight, 5% by weight or 10% by weight is added to a two component ceramic consisting of lead titanate and lead zirconate and this is fired, the characteristic of the resultant ceramic was greatly lower than the characteristic of the two component system. The characteristics become equal to that of the two component system only when more than 10% of the lead magnesium tungstate is present.

From the above phenomenon it is seen that in the initial stage of the interstitial diffusion of the additive, the piezoelectric properties of the lead titanate and lead zirconate are disturbed and the characteristic of the ceramic is lowered. When the amount of additive has become sufficiently great, a unique structure is constructed and the piezoelectric property is recovered. The piezoelectric property is greatly affected by distortion of the crystal structure. From this phenomenon it becomes apparent that we have formed a completely new three component ceramic rather than improved the two component of lead titanate and lead zirconate.

FIG. 1 shows how the electromechanical coupling coefficient varies when lead magnesium tungstate is added to a two component ceramic of 0.55 mol lead titanate and 0.45 mol lead zirconate.

It can be considered that the three component system ceramic of lead magnesium tungstate, lead titanate and lead zirconate is formed by reaction whereby lead zirconate is diffused by interstitial diffusion into a two component system ceramic of lead magnesium tungstate and lead titanate. Lead magnesium tungstate and lead titanate react at a lower temperature, i.e., at about 1000–1100° C. and, therefore, at the temperature of 1250–1300° C. at which lead zirconate reacts, the lead magnesium tungstate/lead titanate melt becomes porous whereby a ceramic of high density cannot be obtained. For this reason, in order to obtain excellent three component ceramics of high density which is the object of this invention, it is necessary to first cause lead magnesium tungstate and lead titanate to react with each other at a lower temperature to thereby form a ceramic and then slowly diffuse lead zirconate by interstitial diffusion into said ceramic. The control of this reaction is most important. The three component ceramic thus obtained has excellent characteristics as an electromechanical transducer.

Figures 2, 3:
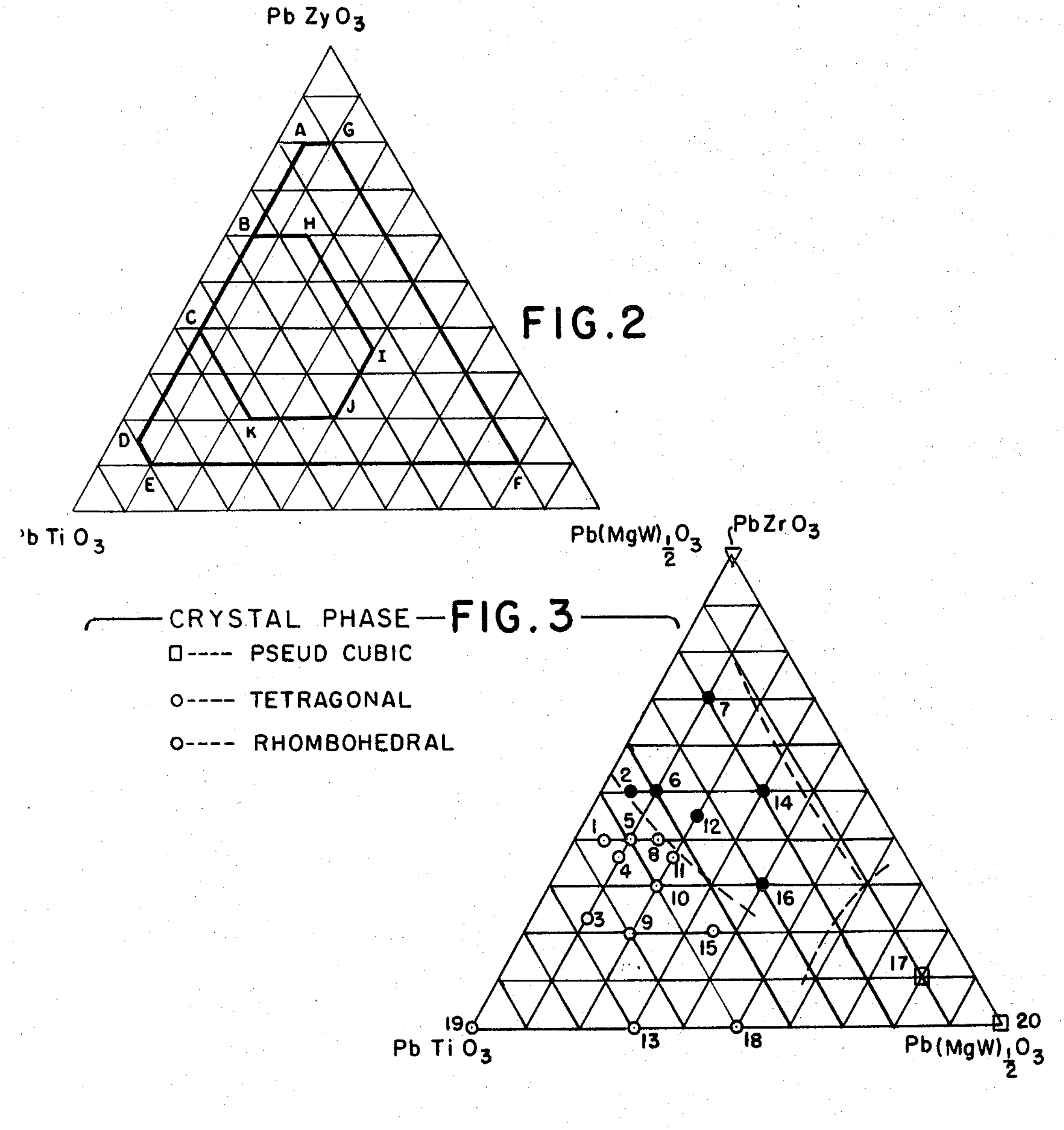
FIG. 2 is a triangular composition diagram showing the range of effect of this invention, wherein the range contained in a polygon of ABCDEFGA shows the limit in which the effect is excellent and BCKJIHB shows the preferred range in which the electromechanical property is excellent.
FIG. 3 is a triangular composition diagram showing the distribution of the crystal phase, by X-ray diffraction, of three component piezoelectric ceramic according to our invention.

The limit in which the three component ceramic of lead magnesium tungstate, lead titanate and lead zirconate can be utilized is the polygonal area contained in ABCDEFGA of FIG. 2 and furthermore the area in which the electromechanical property is the greatest is the polygon contained in BCKJIHB and this can be used in such elements as electromechanical filters. Table 1 shows the components of FIG. 2.

TABLE 1

| | $Pb(Mg\cdot W)_{1/2}O_3$ | $PbTiO_3$ | $PbZrO_3$ (mol.) |
|---|---|---|---|
| A | 0.05 | 0.15 | 0.80 |
| B | 0.05 | 0.35 | 0.60 |
| C | 0.05 | 0.55 | 0.40 |
| D | 0.05 | 0.80 | 0.15 |
| E | 0.10 | 0.80 | 0.10 |
| F | 0.80 | 0.10 | 0.10 |
| G | 0.10 | 0.10 | 0.80 |
| H | 0.15 | 0.25 | 0.60 |
| I | 0.40 | 0.25 | 0.35 |
| J | 0.40 | 0.40 | 0.20 |
| K | 0.25 | 0.55 | 0.20 |

As the result of a further crystallographical investigation by X-ray diffraction, the tetragonal phase and the rhombohedral phase are shown in FIG. 3. By comparison of FIG. 4 with FIG. 3 it is seen that the piezoelectric property is most improved around the boundary between the two phases. The pseudo-cubic phase is not ferroelectric but is an area that can be utilized piezoelectrically.

Furthermore, an advantage of the three component ceramic of lead magnesium tungstate, lead titanate and lead zirconate in accordance with this invention as an electromechanical transducer is that the resonance is excellent when oscillated, that is, an excellent resonance can be obtained and Q$m$ can be made large when the ceramic is applied to a mechanical filter.

When the electromechanical coupling coefficient of a two component ceramic of lead titanate and lead zirconate and the electromechanical coupling coefficient of the three component ceramic according to our invention are nearly equal, the mechanical Q$m$ of the latter is nearly twice as large as that of the former.

| | ($kp$): planar coupling factor | Q$m$ |
|---|---|---|
| $PbZrO_3/PbTiO_3$ system | 40% | 75 |
| $Pb(Mg\cdot W)_{1/2}O_3/PbTiO_3/PbZrO_3$ system | 50% | 180 |

The electromechanical coupling coefficient and the mechanical Q$m$ are inversely related and if one is made large, the other becomes small naturally, wherefore if only the electromechanical coupling constant is noted, the planar coupling factor can amount to 50%–60%.

These constants are ordinarily utilized for judging the performance when the piezoelectric materials are used as mechanical resonators or electromechanical transducers. Various kinds of applications are also often determined by these constants. For example, when the piezoelectric materials are used as pickups, microphones and ultrasonic resonators, the electromechanical coupling coefficient must be made large whereas when said materials are used as mechanical filters and the like, the mechanical Q$m$ must be made large. In these cases, it is most convenient to change the electromechanical coupling factor and the mechanical Q$m$ according to the purposes of use by adding additives to the materials.

Another object of our invention is to provide the most effective additive for the three component piezoelectric ceramic of lead magnesium tungstate, lead titanate and lead zirconate.

In general, the factor for enlarging the mechanical Q*m* and the factor for enlarging the electromechanical coupling coefficient are exactly reverse to each other. If the mechanical Q*m* is made large, the electromechanical coupling factor becomes small necessarily while, adversely, if the electromechanical coupling coefficient is made large, the mechanical Q*m* becomes small. Namely, a material with a large mechanical Q*m* has a large Young's modulus and small Poisson's ratio and is rigid and fragile whereas a material of a large electromechanical coupling factor has a relatively small Young's modulus and a large Poisson's ratio. Thus, it is apparent that the mechanical Q*m* and the electromechanical coupling coefficient are inverse to each other.

For this reason, it is necessary to select additives corresponding to the purposes of use of the ceramic. We have added various kinds of metal oxides to the three component ceramic consisting of lead magnesium tungstate, lead titanate and lead zirconate and investigated the electromechanical properties, and, as the result, have found that iron oxides, manganese oxides and chromium oxides reduce the Poisson's ratio and increase Young's modulus, thus increasing the mechanical Q*m*, and that rare earth metal oxides represented by lanthanum oxides and niobium oxides increase Poisson's ratio and reduce Young's modulus, whereby materials of large electromechanical coupling coefficient can be obtained.

We have further found that silicon dioxide ($SiO_2$) plays an important part as a second additive. That is, by adding the proper amount of silicon dioxide to the above-mentioned various kinds of metal oxides, the mechanical Q*m* can be further enlarged and the electromechanical coupling coefficient can also be greatly improved. For example, when 0.5 percent wt. $Fe_2O_3$ is added to a combination of $Pb(Mg\cdot W)_{1/2}O_3$ of 0.15 mol, $PbTiO_3$ of 0.40 mol and $PbZrO_3$ of 0.45 mol, the mechanical Q*m* becomes 1300 and the planar coupling factor (*kp*) becomes 36% whereas when 0.02–0.5 wt. percent silicon dioxide is also added, Q*m* becomes 1500–1700 and *kp* becomes 40%.

A further object of our invention is to improve the temperature characteristic of the resonance frequency and the secular variation. Chromium oxide, from the metal oxides as above described, greatly improves the temperature characteristic of the resonance frequency. However, when chromium oxide is coexistent with iron oxide or manganese oxide, the electromechanical property is also greatly improved, wherefore a piezoelectric element having a particularly excellent stability can be obtained. Details of this point will become apparent from the description of specific embodiments hereinbelow.

EXAMPLES

An example of the method of manufacturing lead magnesium tungstate is as follows. First of all, 446.42 g. lead oxide (PbO), 249.9 g. tungstic acid ($H_2WO_4$) or 231.9 g. tungsten trioxide ($WO_3$) and 40.3 g. magnesium oxide (MgO) were well ground and mixed in a mortar or the like. These were then placed in an alumina ceramic crucible and calcined for an hour at a temperature of 900° C. Thus, a yellow solid lead magnesium tungstate ($Pb(Mg\cdot W)_{1/2}O_3$) ceramic was obtained.

Next, a method of manufacturing lead titanate will be described. 223.21 g. lead oxide (PbO) and 79.9 g. titanium oxide ($TiO_2$) of a purity of above 99.8% were well ground and mixed in a mortar or the like and were then put in an alumina ceramic crucible and were calcined for an hour at a temperature of 900° C. Thus, a light yellow green lead titanate ($PbTiO_3$) was obtained.

Lead zirconate was produced by grinding together 223.21 g. lead oxide (PbO) and 123.22 g. zirconium oxide ($ZrO_2$) of a purity of about 99.5% in a mortar or the like. These were then placed into an alumina ceramic crucible and calcined for an hour at a temperature of 900° C., to form a light yellow lead zirconate ($PbZrO_3$).

No particular consideration is required in the calcination of lead magnesium tungstate, lead titanate and lead zirconate described above. It is only necessary to cover the alumina ceramic crucible and calcine it in a box-type furnace.

As an example of manufacturing the three component piezoelectric ceramic of lead magnesium tungstate, lead titanate and lead zirconate according to our invention, $Pb(Mg\cdot W)_{1/2}O_3$, $PbTiO_3$ and $PbZrO_3$, manufactured as described above, were mixed in the following ratio:

| | Mol | Grams |
|---|---|---|
| $Pb(Mg\cdot W)_{1/2}O_3$ | 0.15 | 53.85 |
| $PbTiO_3$ | 0.45 | 136.40 |
| $PbZrO_3$ | 0.40 | 138.57 |

The $Pb(MG\cdot W)_{1/2}O_3$, $PbTiO_3$ and Pb $ZrO_3$ were well mixed and ground for several hours in a mortar of alumina, ceramic or agate under a dry atmosphere, and after being reduced to corpuscles under 1 micron, they were placed into a suitable mold and molded under a pressure of 0.5–1.0 ton/cm.². The compact formed was taken out of the mold and placed into a crucible or a boat and fired. Here it is not necessary to take the evaporation of lead oxide (PbO) into consideration. Such particular consideration as was required in the two component system of lead titanate ($PbTiO_3$) and lead zirconate ($PbZrO_3$) is not necessary in this case. The firing condition was as follows. The molded material was first heated slowly for 3 hours at a temperature of 1100–1200° C. and then it was kept at a temperature of 1200–1300° C. for an hour and was then cooled in order to cause $Pb(Mg\cdot W)_{1/2}O_3$ and $PbTiO_3$ to react preferentially as described above. The cooled sintered ceramic was cut into a required size and its surface polished and then painted with silver on both surfaces of the piece, fired at 600° C., and electrodes attached.

The Curie point and the dielectric properties are measured by the use of this sample. In the measurement of the electromechanical properties, the polarization is performed by a direct current electric field of 40 kv./cm. within a silicone oil of a temperature of 140° C. This condition is the polarization condition for enlarging the electromechanical coupling coefficient. On the other hand, in order to enlarge the mechanical Q*m* in general, the polarization is ordinarily performed under a low temperature and a high electric field such as, for example, 60° C. and 50 kv./cm.², but the three component piezoelectric ceramic of our invention is such that the mechanical Q*m* can be enlarged by enlarging the polarization.

Figure 4:
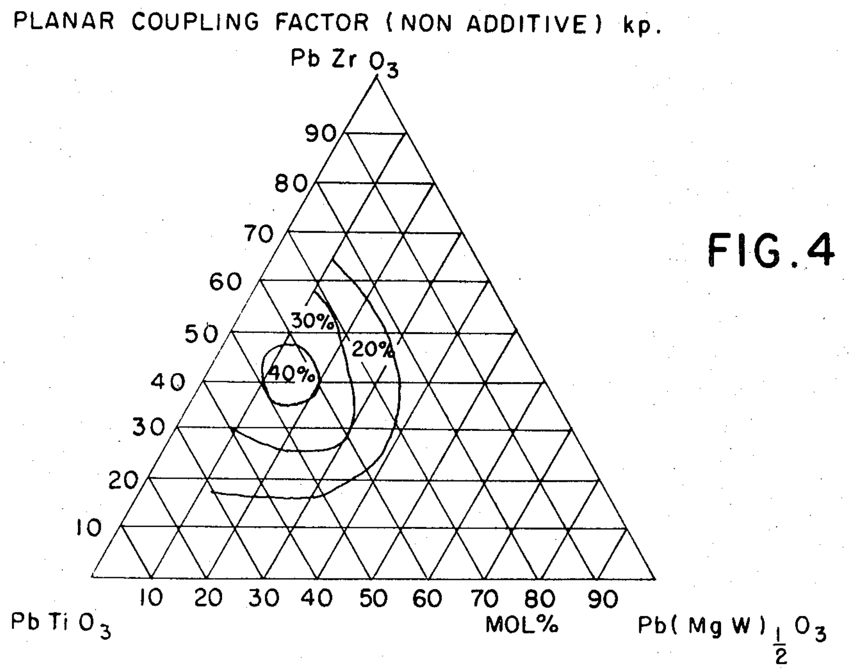
FIG. 4 is a triangular composition diagram showing the distribution of the electromechanical coupling coefficient of three component piezoelectric ceramic according to our invention.

FIG. 4 shows that the planar coupling factor (*kp*) obtained exceeded 40%. In the present embodiment, *kp* was 50% and Q*m* was 200. As described above, the three component piezoelectric ceramic of $Pb(Mg\cdot W)_{1/2}O_3$, $PbTiO_3$ and $PbZrO_3$ in accordance with our invention exhibits excellent piezoelectric properties, and it became evident that it is a novel piezoelectric substance having excellent characteristics as an electromechanical transducer.

Furthermore, the crystal phase shown in FIG. 3 has the perovskite-type structure and can be divided into the tetragonal phase and the rhombohedral phase and exhibits a strong piezoelectric property. Said crystal system also has a pseudo-cubic section, but this is an area that can be utilized satisfactorily as the piezoelectric substance.

Figure 5:
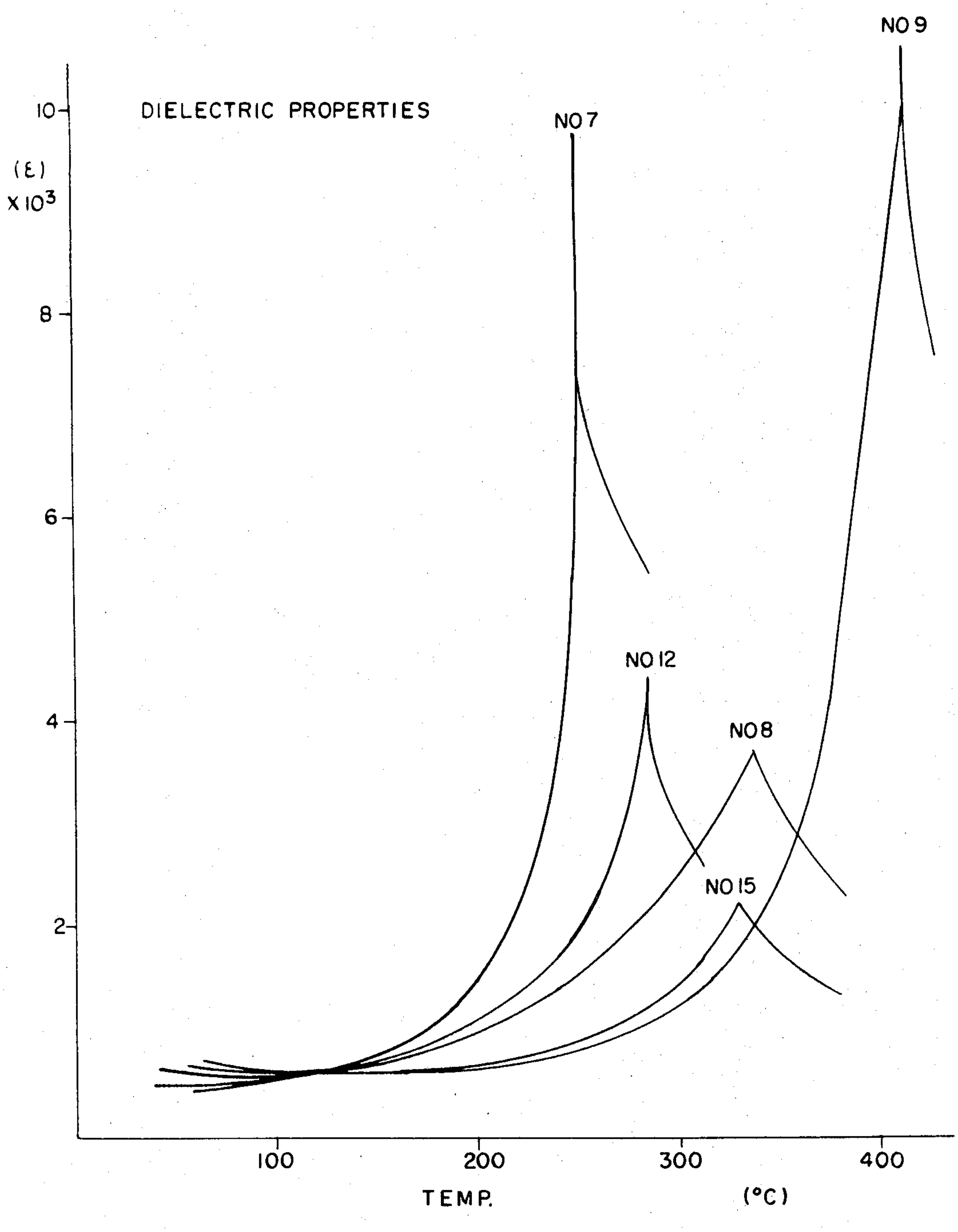
FIG. 5 shows an example of the dielectric properties in 1 kc. of three component piezoelectric ceramic according to our invention.

FIG. 5 shows an example of the dielectric properties of our invention. It is seen that notable peaks of dielectric constants are formed at the Curie points.

Figure 6:
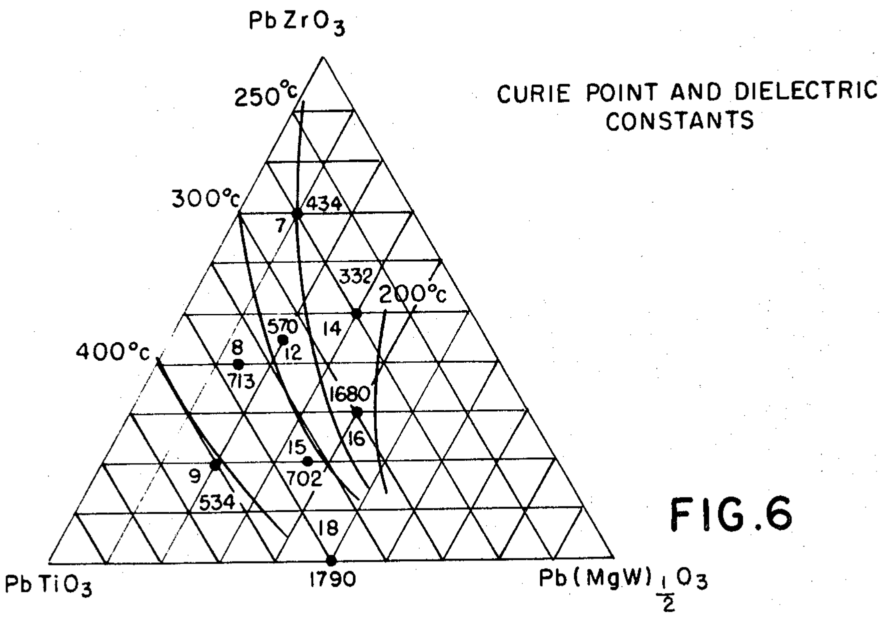
FIG. 6 is a triangular composition diagram showing the distribution of the dielectric properties of three component piezoelectric ceramic according to our invention and the distribution of the Curie point and the dielectric constant (1 kc.).

FIG. 6 shows the distribution in the three phase diagram of the Curie point and the distribution of the dielectric constant measured at 20° C. and in 1 kc. Sometimes, $10^3$ is exceeded.

Table 2 shows an example of the lattice parameters in each composition.

TABLE 2

[Latice parameter of $Pb(Mg{\cdot}W)_{1/2}O_3/PbTiO_3/PbZrO_3$ family]

| Number | $Pb(Mg{\cdot}W)_{1/2}O_3$ | $PbTiO_3$ | $PbZrO_3$ | Crys. f | a | c | c/a |
|---|---|---|---|---|---|---|---|
| 1 | 0.05 | 0.55 | 0.40 | T | | | |
| 2 | 0.05 | 0.45 | 0.50 | Rh | | | |
| 3 | 0.10 | 0.65 | 0.25 | T | 3.99 | 4.13 | 1.035 |
| 4 | 0.10 | 0.53 | 0.37 | T | 4.015 | 4.14 | 1.030 |
| 5 | 0.10 | 0.50 | 0.40 | T | 4.010 | 4.11 | 1.025 |
| 6 | 0.10 | 0.40 | 0.50 | Rh | 4.09 | | |
| 7 | 0.10 | 0.20 | 0.70 | Rh | | | |
| 8 | 0.15 | 0.45 | 0.40 | T | | | |
| 9 | 0.20 | 0.60 | 0.20 | T | | | |
| 10 | 0.20 | 0.50 | 0.30 | T | 4.06 | 4.085 | 1.01 |
| 11 | 0.20 | 0.43 | 0.37 | T | 3.98 | 4.20 | 1.05 |
| 12 | 0.20 | 0.35 | 0.45 | Rh | 4.06 | | |
| 13 | 0.30 | 0.70 | 0.00 | T | 4.025 | 3.93 | 0.976 |
| 14 | 0.30 | 0.20 | 0.50 | Rh | | | |
| 15 | 0.35 | 0.45 | 0.20 | T | 4.045 | 4.11 | 1.018 |
| 16 | 0.40 | 0.30 | 0.30 | Rh | 4.065 | | |
| 17 | 0.80 | 0.10 | 0.10 | Pc | 4.027 | | |
| 18 | 0.50 | 0.50 | 0.00 | T | | | |
| 19 | 0.00 | 1.00 | 0.00 | T | | | |
| 20 | 1.00 | 0.00 | 0.00 | Pc | 4.045 | | |

T=Tetragonal; Rh=Rhombohedral; Pc=Pseudo cubic.

An example of the method of improving the electromechanical property by adding various kinds of additives will be described next. $Pb(Mg{\cdot}W)_{1/2}O_3$, $PbTiO_3$ and $PbZrO_3$, manufactured by the methods as described hereinabove, were mixed in the following ratio:

| | Mol | Grams |
|---|---|---|
| $Pb(Mg{\cdot}W)_{1/2}O_3$ | 0.15 | 53.85 |
| $PbTiO_3$ | 0.45 | 136.40 |
| $PbZrO_3$ | 0.40 | 138.57 |

The $Pb(Mg{\cdot}W)_{1/2}O_3$, $PbTiO_3$ and PbZrO, were well mixed and ground for several hours by the dry method in a mortar of alumina, ceramic or agate. After the materials had been reduced to corpuscles and well mixed, 1.644 g. ferric oxide ($Fe_2O_3$) of 0.5% by weight was added. The mixing and grinding were repeated. After the materials had been well mixed, they were placed into an alumina ceramic crucible and calcined for an hour at 900° C. After being cooled, the calcined material was taken out and ground as described above. After the material had been reduced to corpuscles, it was placed into a mold and molded under a pressure of 0.5 ton/cm.$^2$. This was placed into an alumina boat and fired. As in the case in which no additive was added, it was not necessary to give any special consideration to the firing condition. However, in some cases, better results can be obtained when the firing is performed in an inert gas. The firing program, in order that $Pb(Mg{\cdot}W)_{1/2}O_3$ and $PbTiO_3$ may react preferentially, was as follows. The temperature was raised slowly from 1100° C. to 1200° C. in about 3 hours. Then the temperature was kept at 1245° C. for an hour. After this, the materials were cooled. The cooled sintered ceramic was cut into the required size and its surface was polished. Silver paint was then painted on both surfaces of said piece which was then fired at 600° C. and electrodes were attached thereto.

When the electromechanical properties were measured by the use of this sample, the polarization was performed by a DC electric field of 40 kv./cm. within a silicone oil of a temperature of 140° C. As the result, the planar coupling factor ($kp$) becomes 36% and $Qm$ becomes 1300. $kp$ can be further increased by further raising the temperature at the time of the polarization; if the polarization is performed at 170° C. and 30 kv./cm., $kp=56\%$ and $Qm=120$ can be obtained. Furthermore, if 0.02–0.5% by weight silicon dioxide were added, $kp=40\%$ and $Qm=1650$ can be obtained.

Table 3 shows electromechanical properties of embodiments manufactured by adding various kinds of additives such as $Fe_2O_3$, $Cr_2O_3$, $MnO_2$, $La_2O_3$ and $Nb_2O_5$. From this table is seen the marked improving effect of the additives.

Table 4 shows the electromechanical properties of various kinds of $Pb(Mg{\cdot}W)_{1/2}O_3/PbTiO_3/PbZrO_3$ ceramic to which the additives have been added.

Figure 8:
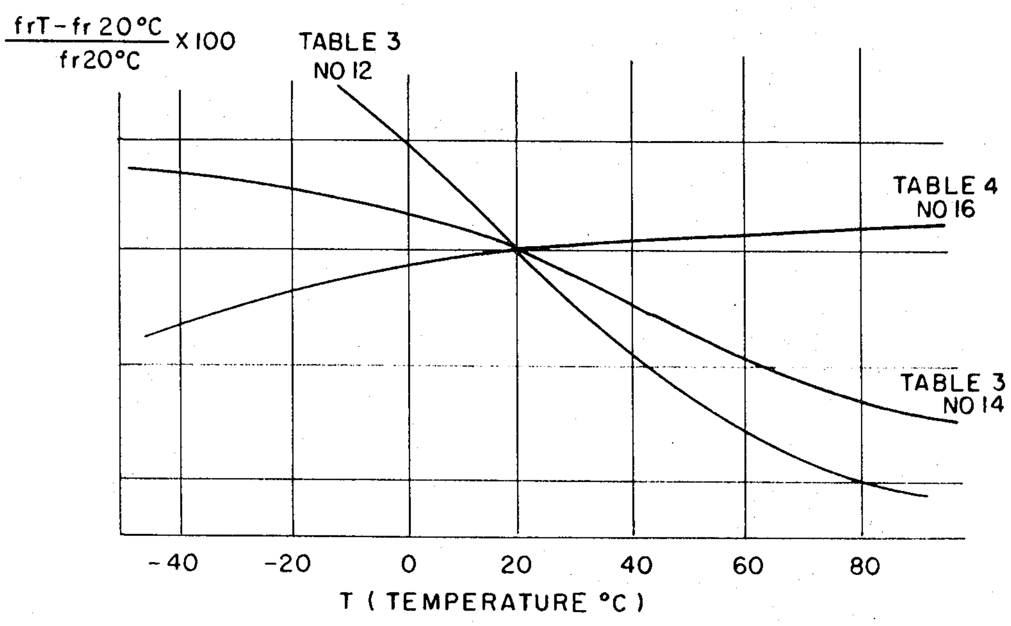
FIG. 8 shows an example of the temperature characteristic of the resonance frequency of three component piezoelectric ceramic according to our invention utilized as a resonator.

Some of the values of Table 3 and Table 4 are shown in FIG. 8.

TABLE 3

| No. | Basic composition, mol. | Additive, percentby weight | | | | Firing temp., ° C. | Density, g./cm.$^3$ | Electro-mechanical properties | | |
|---|---|---|---|---|---|---|---|---|---|---|
| | | $Fe_2O_3$ | $Cr_2O_3$ | $MnO_2$ | Others | | | Mechanical, $Qm$ | Coupling factor or $kp$, percent | Temperature change in resonant frequency $fr{\cdot}Te$ |
| 1 | $Pb(Mg{\cdot}W)_{1/2}O_3$ 0.13 | | | | | 1,250 | 7.4 | 300 | 28 | $-1\times10^{-4}$ |
| 2 | $PbTiO_3$, 0.47 | 0.1 | | | | 1,250 | 7.5 | 620 | 32 | $+7\times10^{-5}$ |
| 3 | $PbZrO_3$, 0.40 | 0.5 | | | | 1,250 | 7.5 | 830 | 37 | $+6\times10^{-5}$ |
| 4 | | 1.0 | | | | 1,250 | 7.6 | 851 | 37 | $+8\times10^{-5}$ |
| 5 | | 2.0 | | | | 1,245 | 7.5 | 513 | 35 | $+1\times10^{-4}$ |
| 6 | | 0.1 | | 0.1 | | 1,250 | 7.5 | 800 | 39 | $-6\times10^{-5}$ |
| 7 | | 0.2 | 0.3 | | | 1,250 | 7.7 | 940 | 48 | $+4\times10^{-5}$ |
| 8 | | 0.2 | 0.5 | | | 1,250 | 7.7 | 920 | 38 | $+1\times10^{-5}$ |
| 9 | | 0.2 | 1.0 | | | 1,250 | 7.5 | 730 | 35 | $+5\times10^{-5}$ |
| 10 | | 0.2 | 2.0 | | | 1,250 | 7.4 | 620 | 32 | $+8\times10^{-5}$ |
| 11 | $Pb(Mg{\cdot}W)_{1/2}O_3$, 0.13 | | | | | 1,250 | 7.4 | 315 | 29 | $-1\times10^{-4}$ |
| 12 | $PbTiO_3$, 0.45 | | | 0.1 | | 1,250 | 7.5 | 560 | 42 | $-7\times10^{-5}$ |
| 13 | $PbZrO_3$, 0.42 | | | 0.3 | | 1,250 | 7.6 | 830 | 45 | $-5\times10^{-5}$ |
| 14 | | | | 0.5 | | 1,250 | 7.7 | 850 | 49 | $-3\times10^{-5}$ |
| 15 | | | | 1.0 | | 1,250 | 7.6 | 900 | 42 | $-6\times10^{-5}$ |
| 16 | | 0.2 | | 0.2 | | 1,250 | 7.6 | 1,200 | 38 | $-3\times10^{-5}$ |
| 17 | | | 0.3 | 0.5 | | 1,250 | 7.7 | 1,310 | 45 | $-5\times10^{-5}$ |
| 18 | | | 0.3 | 0.5 | | 1,250 | 7.7 | 1,300 | 38 | $-1\times10^{-5}$ |
| 19 | | 0.1 | 0.2 | 0.5 | | 1,250 | 7.7 | 1,100 | 45 | $-2\times10^{-5}$ |
| 20 | | | | | $La_2O_3$, 0.2 | 1,245 | 7.5 | 90 | 50 | $-1\times10^{-4}$ |
| 21 | | | | | $La_2O_3$, 0.5 | 1,245 | 7.5 | 90 | 63 | $-1\times10^{-4}$ |
| 22 | | | | | $La_2O_3$, 1.0 | 1,245 | 7.4 | 78 | 48 | $-1\times10^{-4}$ |
| 23 | | | | | $Nb_2O_5$, 0.2 | 1,245 | 7.5 | 90 | 44 | $-1\times10^{-4}$ |
| 24 | | | | | $Nb_2O_5$, 0.5 | 1,245 | 7.5 | 90 | 52 | $-1\times10^{-4}$ |
| 25 | | | | | $Nb_2O_5$, 1.0 | 1,245 | 7.5 | 85 | 59 | $-2\times10^{-4}$ |

TABLE 4

| No. | Basic composition, mol. | Additive, percent by weight | | | | Firing temp., ° C. | Density, g./cm.³ | Electro-mechanical properties | | |
|---|---|---|---|---|---|---|---|---|---|---|
| | | $Fe_2O_3$ | $Cr_2O_3$ | $MnO_2$ | Others | | | Mechanical, *Qm* | Coupling factor *kp*, percent | Temperature change in resonant frequency, *fr·Te* |
| 1 | $Pb(Mg·W)_{1/2}O_3$, 0.1 | | | | | 1,250 | 7.3 | 295 | 39 | |
| 2 | $PbTiO_3$ 0.5 | 0.5 | | | | 1,250 | 7.6 | 500 | 39 | $5\times10^{-5}$ |
| 3 | $PbZrO_3$ 0.4 | | 0.5 | | | 1,250 | 7.6 | 600 | 32 | $3\times10^{-5}$ |
| 4 | | | | | $La_2O_3$, 0.5 | 1,240 | 7.5 | 90 | 60 | $1\times10^{-4}$ |
| 5 | $Pb(Mg·W)_{1/2}O_3$, 0.1 | | | 0.5 | | 1,250 | 7.5 | 318 | 52.3 | $-6\times10^{-5}$ |
| 6 | $PbTiO_3$, 0.48 | | | 0.5 | | 1,250 | 7.5 | 800 | 45 | $-5\times10^{-5}$ |
| 7 | $PbZrO_3$, 0.42 | | | | $Nb_2O_5$, 0.5 | 1,240 | 7.4 | 100 | 55 | $-1\times10^{-4}$ |
| 8 | $Pb(Mg·W)_{1/2}O_3$, 0.1 | | | | | 1,255 | 7.3 | 300 | 25 | |
| 9 | $PbTiO_3$, 0.4<br>$PbZrO_3$, 0.5 | 0.5 | | | | 1,255 | 7.5 | 475 | 36 | |
| 10 | $Pb(Mg·W)_{1/2}O_3$, 0.12 | | | | | 1,250 | 7.4 | 300 | 30 | $-1\times10^{-4}$ |
| 11 | $PbTiO_3$, 0.48 | 0.5 | | | | 1,250 | 7.5 | 835 | 33 | $+8\times10^{-5}$ |
| 12 | $PbZrO_3$, 0.40 | | 0.5 | | | 1,250 | 7.5 | 831 | 35 | $+6\times10^{-5}$ |
| 13 | | | | 0.5 | | 1,250 | 7.5 | 1,015 | 37 | $-6\times10^{-5}$ |
| 14 | | | | | $La_2O_3$, 0.5 | 1,245 | 7.4 | 92 | 58 | $-1\times10^{-4}$ |
| 15 | | 0.2 | 0.3 | | | 1,250 | 7.6 | 909 | 48 | $+4\times10^{-5}$ |
| 16 | | 0 2 | 0.5 | | | 1,250 | 7.6 | 915 | 35 | $+1\times10^{-5}$ |
| 17 | | | 0.3 | 0.3 | | 1,250 | 7.6 | 1,200 | 45 | $-5\times10^{-5}$ |
| 18 | | | | | $Nb_2O_5$, 0.3 | 1,245 | 7.4 | 97 | 58 | $-1\times10^{-4}$ |
| 19 | $Pb(Mg·W)_{1/2}O_3$, 0.15 | | | | | 1,245 | 7.3 | 300 | 40 | $-8\times10^{-5}$ |
| 20 | $PbTiO_3$, 0.45 | | | 0.5 | | 1,245 | 7.6 | 850 | 47 | $-6\times10^{-5}$ |
| 21 | $PbZrO_3$, 0.40 | | | 1.0 | | 1,245 | 7.6 | 900 | 42 | $-7\times10^{-5}$ |
| 22 | | | | 1.0 | | 1,245 | 7.6 | 333 | 58 | $-8\times10^{-5}$ |
| 23 | | | 0.3 | 0.5 | | 1,245 | 7.6 | 1,315 | 41 | $-3\times10^{-5}$ |
| 24 | | | | | $La_2O_3$, 0.5 | 1,240 | 7.4 | 83 | 53 | $-1\times10^{-4}$ |
| 25 | $Pb(Mg·W)_{1/2}O_3$, 0.2 | 0.4 | | 0.2 | | 1,235 | 7.4 | 300 | 51 | $-1\times10^{-4}$ |
| 26 | $PbTiO_3$, 0.45<br>$PbZrO_3$, 0.35 | | | | $La_2O_3$, 0.5 | 1,235 | 7.3 | 87 | 51 | $-2\times10^{-4}$ |
| 27 | $Pb(Mg·W)_{1/2}O_3$, 0.35 | 0.5 | | | | 1,210 | 7.3 | 100 | 45 | $+4\times10^{-4}$ |
| 28 | $PbTiO_3$, 0.25<br>$PbZrO_3$, 0.40 | 0.5 | | 0.5 | | 1,210 | 7.4 | 300 | 48 | $-3\times10^{-4}$ |
| 29 | $Pb(Mg·W)_{1/2}O_3$, 0.5<br>$PbTiO_3$, 0.3<br>$PbZrO_3$, 0.2 | 0.5 | | | | 1,200 | 6.8 | 202 | 12 | |
| 30 | $Pb(Mg·W)_{1/2}O_3$, 0.5<br>$PbTiO_3$, 0.5 | | | | | 1,150 | 6.9 | 270 | 18 | |
| 31 | $Pb(Mg·W)_{1/2}O_3$, 0.15 | 0.5 | | | | 1,245 | 7.5 | 1,300 | 36 | $+7\times10^{-5}$ |
| 32 | $PbTiO_3$, 0.40 | | | 0.5 | | 1,245 | 7.5 | 900 | 35 | $-5\times10^{-5}$ |
| 33 | $PbZrO_3$, 0.45 | | 0.5 | | | 1,245 | 7.5 | 900 | 35 | $+3\times10^{-5}$ |
| 34 | | | | | $La_2O_3$, 0.5 | 1,240 | 7.4 | 75 | 59 | $-1\times10^{-3}$ |

Figure 7:
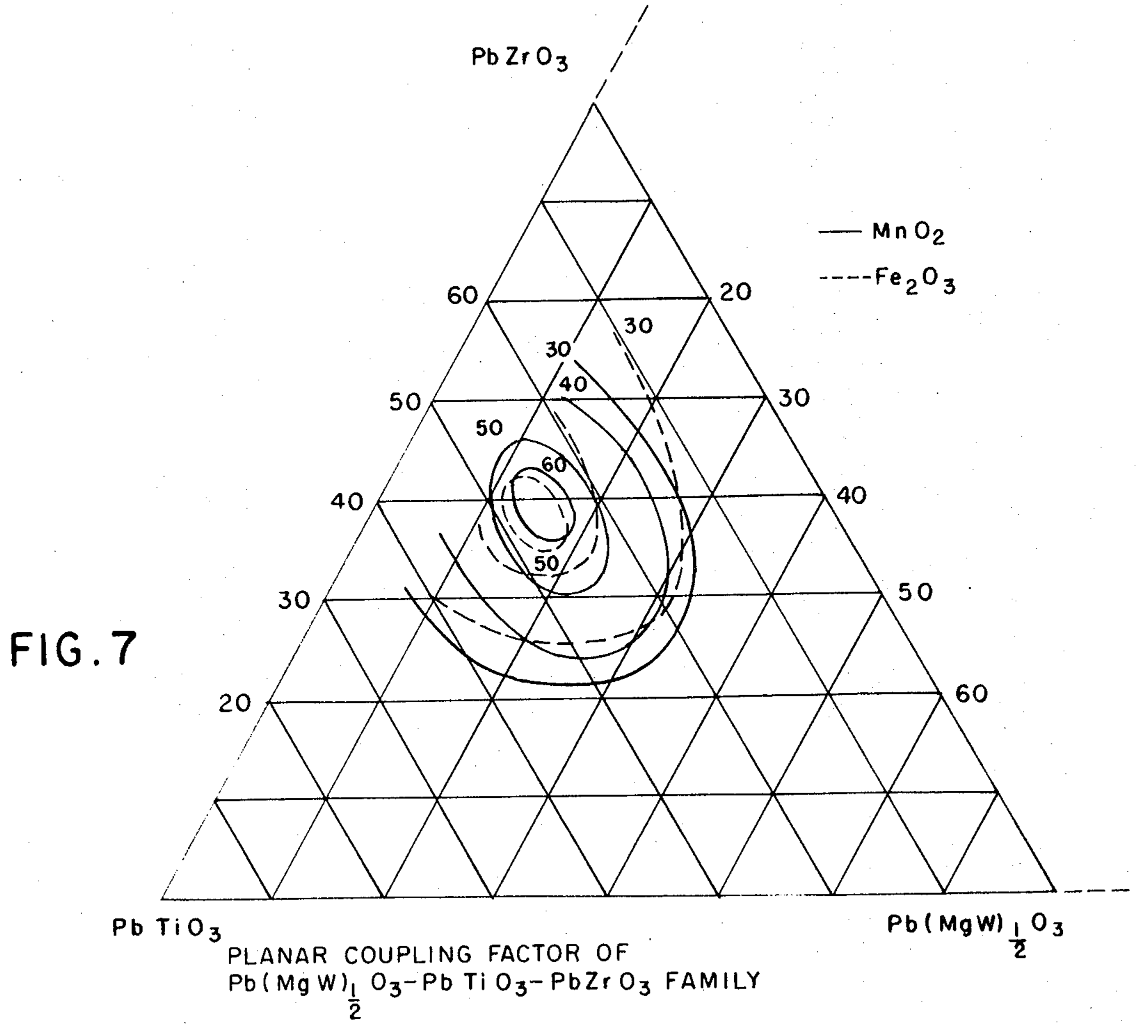
FIG. 7 is a triangular composition diagram showing the distribution and range of the electromechanical coupling coefficient of three component piezoelectric ceramic according to our invention to which $MnO_2$ or $Fe_2O_3$ has been added.

FIG. 7 is a triangular composition diagram showing the distribution of the electromechanical coupling coefficient of the ceramic of our invention to which $Fe_2O_3$ and $MnO_2$ have been added. This diagram shows that the state of distribution varies sightly depending on the additives. When $MnO_2$ is added, $Pb(Mg·W)_{1/2}O_3$ of 0.13 mol, $PbTiO_3$ of 0.45 mol and $PbZrO_3$ of 0.42 mol are the maximum and when $Fe_2O_3$ is added, 0.13 mol/0.47 mol/0.40 mol is the maximum. Here, the area in the triangular composition diagram in which the electromechanical property is excellent is included in BCKJIHB of FIG. 2.

Furthermore, as to the effect given by the resonance frequency to the temperature characteristic, the addition of $Cr_2O_3$ greatly improves the temperature characteristic. However, $La_2O_3$ and $Nb_2O_5$ cannot give such effect.

As evident from the above explanation of the details of this invention, the three component piezoelectric ceramic of $Pb(Mg·W)_{1/2}$, $PbTiO_3$ and $PbZrO_3$ exhibits a completely new excellent electromechanical property and it will be evident that various kinds of piezoelectric transducers using this material can exhibit a greatly improved characteristic.

We claim:

1. A three component piezoelectric ceramic composition $(Pb(Mg·W_{1/2}O_3)_x$, $(PbTiO)_y$ and $(PbZrO_3)_{1-x-y}$ having a composition within the range contained in polygon ABCDEFGA in the triangular composition diagram shown in FIG. 2 wherein

| | $Pb(Mg·W)_{1/2}O_3$ | $PbTiO_3$ | $PbZrO_3$ |
|---|---|---|---|
| A | 0.05 | 0.15 | 0.80 |
| B | 0.05 | 0.35 | 0.60 |
| C | 0.05 | 0.55 | 0.40 |
| D | 0.05 | 0.80 | 0.15 |
| E | 0.10 | 0.80 | 0.10 |
| F | 0.80 | 0.10 | 0.10 |
| G | 0.10 | 0.10 | 0.80 |
| A | 0.05 | 0.15 | 0.80 |

and containing as additives at least one member of the group consisting of iron oxide, chromium oxide manganese oxide, lanthanum oxide and niobium oxide in an amount of from 0.1 to 2% by weight together with 0.02 to 0.5% by weight of silicon dioxide.

2. An electromechanical filter element manufactured from the three component system piezoelectric ceramic composition of $(Pb(Mg·W)_{1/2}O_3)_x$, $(PbTiO_3)_y$ and $(PbZrO_3)_{1-x-y}$, having a composition within the range contained in polygon BCKJIHB in the triangular composition diagram shown in FIG. 2 wherein

| | $Pb(Mg·W)_{1/2}O_3$ | $PbTiO_3$ | $PbZrO_3$ |
|---|---|---|---|
| B | 0.05 | 0.35 | 0.60 |
| C | 0.05 | 0.55 | 0.40 |
| K | 0.25 | 0.55 | 0.20 |
| J | 0.40 | 0.40 | 0.20 |
| I | 0.40 | 0.25 | 0.35 |
| H | 0.15 | 0.25 | 0.60 |
| B | 0.05 | 0.35 | 0.60 |

and containing as additives at least one member of the group consisting of iron oxide, chrominum oxide, manganese oxide, lanthanum oxide and niobium oxide in an amount of from 0.1 to 2% by weight, together with 0.02 to 0.5% by weight of silicon dioxide.

References Cited

UNITED STATES PATENTS 3,068,177 12/1962 Sugden ............ 252—62.9
3,268,453 8/1966 Ouchi et al. ........ 252—62.9

OTHER REFERENCES

Smolenskii et al., Soviet Physics—Solid State, vol 13, No. 3, pp. 714–720 (1961).

HELEN M. McCARTHY, Primary Examiner
J. COOPER, Assistant Examiner

U.S. Cl. X.R.

106—39